Jan. 7, 1958 E. O. KEIZER 2,819,337

AUTOMATIC GAIN CONTROL CIRCUITS

Filed June 14, 1952

INVENTOR.
EUGENE O. KEIZER
BY
ATTORNEY

United States Patent Office 2,819,337

Patented Jan. 7, 1958

2,819,337

AUTOMATIC GAIN CONTROL CIRCUITS

Eugene O. Keizer, Princeton, N. J., assignor to Radio Corporation of America, a corporation of Delaware Application June 14, 1952, Serial No. 293,700

4 Claims. (Cl. 178—7.3)

This invention relates to automatic gain control circuits (AGC) circuits for radio receivers adapted to receive signals of the television type.

It is an object of this invention to provide an AGC system which is very immune to impulse noises.

In accordance with the illustrated embodiment of the present invention a composite signal of the television type, having its D. C. component preserved, is applied to a first peak charging circuit which charges quickly on sync peaks. The output potential of said first peak charging circuit decays slowly between sync peaks, its time constant being, for instance, equivalent to from one to ten sync peak intervals (horizontal lines). A second peak charging circuit is made to charge quickly to the level of greatest decay of the output potential of the first peak charging circuit, the time constant of the second peak charging circuit being larger than that of the first peak charging circuit. The output potential of the second peak charging circuit is used, either directly or indirectly, as an AGC potential.

Figure 1:
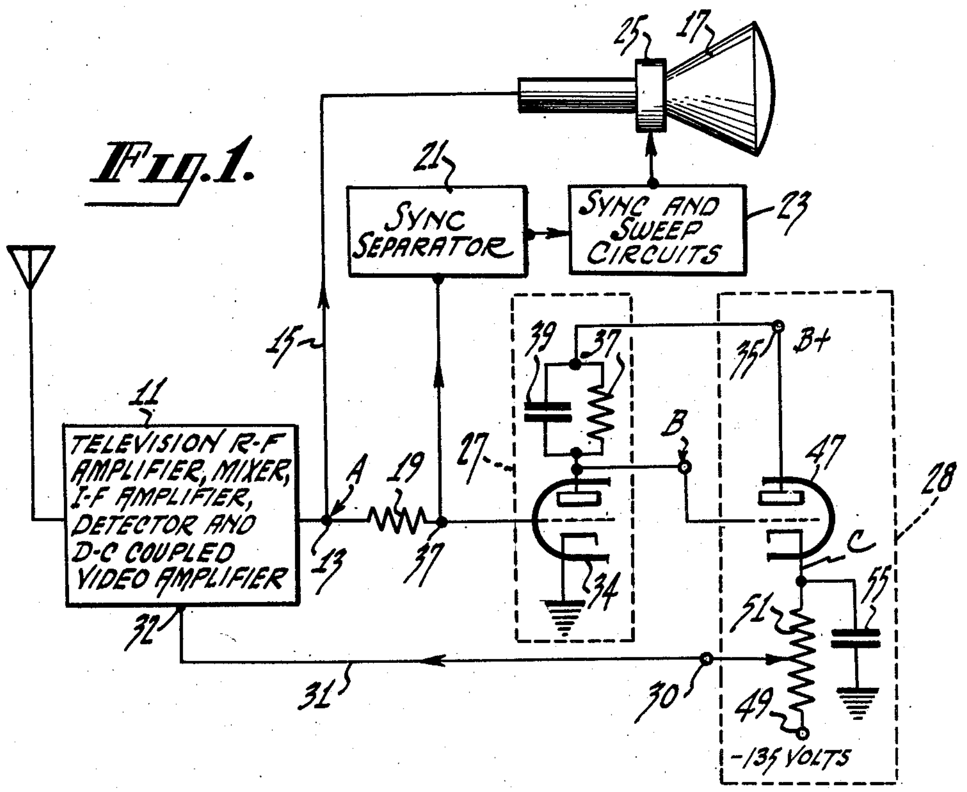
Figure 2:
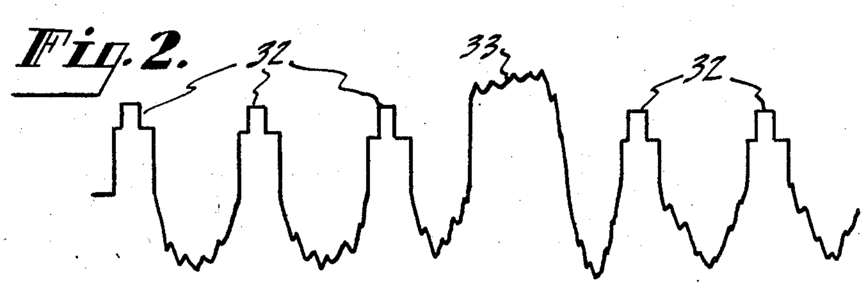

Other and incidental objects of the present invention will be apparent to those skilled in the art from a reading of the following specification, and an inspection of the accompanying drawing in which:

Figure 1 shows one embodiment of the present invention applied to a television receiver; and Figure 2 shows waveforms helpful in the understanding of the operation of the circuit of Figure 1.

Referring to Figure 1, there is shown a rectangle 11 representing a television R. F. amplifier, mixer, I. F. amplifier, detector, and D. C. coupled video amplifier. This rectangle 11 includes conventional elements which are well known to those skilled in the art.

Rectangle 11 has an output terminal 13 which is connected in a well known manner to the picture tube 17 to apply television signals thereto. Output terminal 13 may be the plate of the video amplifier included in rectangle 11.

Output terminal 13 is also connected through a resistor 19 to a conventional sync separator 21, which is itself connected to conventional sync and sweep circuits 23. The sync and sweep circuits 23 apply deflection voltages to the deflection yoke 25. The circuits thus far described are conventional, and well known to those skilled in the art.

The automatic gain control (AGC) circuit, in accordance with the present invention, is represented by dashed rectangles 27 and 28. The AGC circuit has an input terminal 29, and an output terminal 30. The gain control potential available at output terminal 30 is applied to rectangle 11 by means of lead 31 in a conventional manner, such as to the control grid of one of the I. F. amplifier tubes included in rectangle 11. This control grid may be designated by terminal 32.

The signal at output terminal 13 is composite sync and video signal, with the D. C. component preserved, and the sync component extending in a positive direction. This signal is shown at Figure 2. The sync peaks are designated by the reference numeral 32, and a burst of noise is designated by the reference numeral 33.

The circuit included in the dashed rectangle 27 is a peak charging circuit. It comprises a unilateral conduction device such as a triode 34 having an anode, a cathode and a control electrode. Its cathode is connected to ground, and its anode is connected to a source of positive potential, indicated by reference numeral 35, through a parallel RC circuit comprising resistor 37 and capacitor 39. The signal present at the output terminal 13 is applied to the control electrode of triode 34. The action of the AGC, which will be explained in detail later, in combination with D. C. components of the signal delivered by the video amplifier in block 11 is such that the region of sync peaks of the signal applied to the control electrode of triode 34 is held between the levels of cutoff and grid current in triode 34. This of course necessitates the maintenance of the potential at point 13 at a sufficiently negative value with respect to circuit ground as to establish grid current cutoff in the triode 34 between sync peaks and in the absence of high amplitude noise excursions.

The circuit included in the dashed rectangle 27 is a peak charging circuit, which may have at time constant of one to ten horizontal lines. During sync peaks, the conduction of triode 34 rapidly lowers the potential at its anode, while between sync peaks this potential rises at a rate determined by the time constant of the RC circuit comprising resistors 37 and capacitor 39. The potential variation at the anode of triode 34 is represented at "B" in Figure 3: this potential variation is a series of sawtooth voltages. The rapid lowering of the potential at the anode of triode 34 is represented at 41, while the slow rise of that potential due to the discharge of capacitor 39 through resistor 37 represented at 43.

The burst of noise, designated by reference numeral 33 on Figure 2, increases the conduction in triode 34, and therefore lowers the potential at the anode of the triode 34. This lowering of the potential at the anode of the triode 34 is indicated at 45 of Figure 3.

The circuit included in the dashed rectangle 28 is a peak charging circuit which charges quickly to the level of the peaks 46 of the potential at the anode of tube 34. The dashed rectangle 28 comprises a unilateral conduction device, such as triode 47, having an anode, a cathode and a control electrode. Its anode is connected to the source of positive potential indicated by reference numeral 35. Its control electrode is connected to the anode of triode 34. Its cathode is connected to a source of ngeative potential indicated at 49 through a potentiometer 51 having a sliding contact 53. A capacitor 55 is connected between the cathode of triode 47 and ground. The cathode of triode 47 follows the peaks of the potential on its grid. The RC combination in the cathode circuit of triode 47 has a larger time constant (for example 20 to 50 horizontal lines) than the RC combination in the anode circuit of triode 34. The potential at the cathode of triode 34 is shown in Figure 3.

Figure 3:
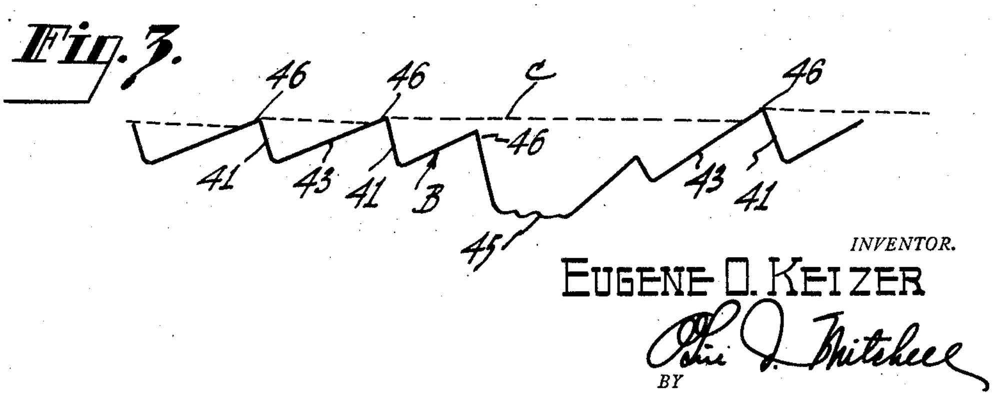

If there is a change in incoming signal strength, the level of the positive peaks of waveform "B" of Figure 3 will change, and the potential at the cathode of triode 47 will change accordingly. If the incoming signal becomes stronger, the peaks 46 will become less positive (or more negative), and a corresponding more negative AGC potential will be obtained at the sliding contact 53. If the incoming signal becomes weaker, the peaks 46 will become more positive (or less negative), and a corresponding less negative signal will be obtained at the sliding contact 53. These AGC potentials, when applied to the control electrode of an I. F. amplifier, are of the proper polarity and magnitude to counteract the changes in incoming signal strength.

The effect of the noise burst 33 on the potential at the anode of the triode 34, which effect is shown at 45 in Figure 3, will have no appreciable effect on the potential at the cathode of triode 47.

The circuit according to the present invention has a very high degree of noise immunity.

What is claimed is:

1. In a radio receiver designated to receive an amplitude modulated carrier having periodically recurrent pulse modulation components representing a substantially fixed percentage of carrier modulation, said carrier being subject to fortuitous interference by noise signals which produce erroneous excursions of the received carrier at least during said pulse components, the combination of: a controllable gain signal amplifier connected to amplify received signals, means coupled with said amplifier for controlling the gain thereof in accordance with an automatic gain control potential; means coupled with said amplifier separating said pulse component from said received carrier; means defining a time constant integrating network having an effective time constant longer than the period of said recurrent pulse components; means coupling said separating means and said network applying means said separated pulses to said network means, to produce a sawtooth waveform defined by recurrent transitions in time between waveform portions of more and less steepness, the steeply sloping portions thereof being defined by said pulse component charging said network and the less steeply sloping portions thereof being defined by the discharge of said time constant network between successive pulse components; means including a unilateral signal detecting means coupled with said network and responsive only to those polarity excursions of said sawtooth defined by specific transitions in time from the less steeply sloping portion to the more steeply sloping portions of the sawtooth waveform to develop a unilateral potential of a value corresponding to the instantaneous potential value of the detected peak excursions; means electrically connected in said detecting means to oppose changes in the unilateral potential developed thereby, said opposing means having an effective time constant value at least equal to the effective time constant value of said integrating network; and means coupling the said unilateral potential developed by said detecting means as an automatic gain control potential to said gain controlling means with such electrical sense as to stabilize the amplitude of signal delivered by said signal amplifier.

2. In a television signal receiver designated to receive a radio carrier amplitude modulated with a composite television signal having a periodically recurring synchronizing pulse component, the peak excursions of said synchronizing component representing a substantially fixed percentage of carrier modulation, said amplitude modulated carrier being subject to fortuitous interference by noise signals which produce unpredictable undesirable excursions of the received carrier, the combination of: a controllable gain signal amplifier connected to amplify received signals, said signal amplifier having an automatic gain control potential input terminal for controlling the gain of said amplifier in accordance with an automatic gain control potential when applied to said automatic gain control input terminal; means coupled with said amplifier and responsive to amplified television signals for separating said recurrent synchronizing pulse component from the composite television signal modulation of said carrier, said synchronizing signal separating means including means maintaining direct current information in the separated synchronizing pulses corresponding to received carrier strength; means comprising a time constant integrating network having a time constant value larger than the recurrence period of said recurrent synchronizing pulse component; direct current conduction means coupled with said synchronizing signal separating means and said time constant integrating network applying said separated synchronizing pulses in integrating relation to said integrating network to transduce said synchronizing pulses into a sawtooth waveform, said sawtooth waveform being defined by recurrent transitions between waveform portions of more and less steepness, the steeply sloping pulses thereof being defined by the charging of said integrating network by said separated synchronizing pulse component and the less steeply sloping portions thereof being defined by the discharge of said time constant integrating network during periods between synchronizing pulse components; means including unilateral signal detecting means coupled with said network and responsive only to those peak polarity excursions of said sawtooth defined by specific transitions in time from the less steeply sloping portion to the more steeply sloping portions of the sawtooth waveform to develop a unilateral potential of a value corresponding to the potential value of the detected peak excursions; means including a time constant circuit connected in said signal detecting means for opposing changes in the unilateral potential delivered thereby, said time constant circuit having a time constant value at least equal to said integrating network time constant value; and means coupled with said detecting means and said amplifier automatic gain control input terminal applying said unilateral potential as an automatic gain potential in gain controlling relation to said signal amplifier with such electrical sense as to stabilize the amplitude of signal delivered by said signal amplifier.

3. In a radio receiver designated to receive an amplitude modulated carrier having a pulse modulation component comprising a train of periodically recurrent pulses each of relatively short duration compared to the periods of their recurrence, each of said pulses representing a substantially fixed percentage of carrier modulation, said carrier being subject to fortuitous interference by noise signals which produce erroneous excursions of the received carrier at least during said pulse components, the combination of: a controllable gain signal amplifier connected to amplify received signal information, said amplifier having an automatic gain control voltage input terminal and including means controlling the gain of said amplifier as a function of the value of automatic gain control potential caused to be applied to said input terminal; means coupled to said amplifier and responsive to substantially only said recurrent pulses to integrate said pulses, the effective time constant of said integrating means being longer than the recurrence period of said pulse component but short enough to produce a sawtooth waveform graphically definable at least in part by recurrent transitions in time between connected waveform portions of more and less steepness respectively, said waveform portions of more steepness corresponding to the arrival of said pulse while said portions of less steepness corresponding to the interval between said pulses; means including a storage time constant circuit of a value greater than the recurrence period of said pulses and responsive only to those polarity excursions of said sawtooth waveform defined by specific transitions in time from less steeply sloping portions to the more steeply sloping portions of said sawtooth waveform to develop a unilateral potential of a value corresponding to the potential value of said specific transitions relative to a datum potential level; and means direct current coupling said unilateral potential as an automatic gain control voltage to said automatic gain control voltage input terminal for controlled the gain of said amplifier as a function of the value of said unilateral potential.

4. In a radio receiver adapted to receive composite signals comprising periodically recurring synchronizing components, an automatic gain control circuit comprising: means separating synchronizing components from received composite signals; a first unilateral conduction device having at least an input electrode and an output electrode; a first time constant charging circuit comprising a resistor and a capacitor connected in parallel; means operatively connecting said first time constant charging circuit in output loading relation to said first conduction device output electrode; means operatively coupled with said synchronizing component separating means and said first unilateral conduction device input electrode, applying said separated synchronizing components to said input electrode with such electrical polarity and amplitude that said synchronizing components produce conduction in said first unilateral conduction device thereby establishing a charge on the capacitor of said first time constant charging circuit during separated synchronizing components; means coupled with said first unilateral conduction device preventing said first unilateral conduction device from conducting when the amplitude of signals applied to the input electrode thereof falls below the lowest amplitude level representing said synchronizing components so that the charge on said capacitor decays through said parallel connected resistor between recurring synchronizing components, the time constant of said capacitor and said resistor combination being equal at least to the time interval between said synchronizing components so that a sawtooth waveform is produced across said capacitor and at the output electrode of said first unilateral conduction device, a second unilateral conduction device having at least an input electrode and an output electrode; means coupled with said second unilateral conduction device input electrode and said capacitor applying said sawtooth waveform to the input electrode of said second unilateral conduction device with such polarity and amplitude that only as the charge on said capacitor due to synchronizing component action reaches its lowest level, is conduction established in said second unilateral conduction device; a second charging circuit comprising a capacitor and a resistor connected in parallel and having a time constant substantially greater than the time constant of the capacitor and resistor combination connected with said first unilateral conduction device; and means connecting said second charging circuit in output loading relation to the output electrode of said second unilateral conduction device such that the unilateral potential developed across said second charging circuit is of such electrical polarity and sense for use as an automatic gain control potential in said receiver.

References Cited in the file of this patent

UNITED STATES PATENTS

| | | |
|---|---|---|
| 2,185,612 | Trevor | Jan. 2, 1940 |
| 2,240,533 | Wilson | May 6, 1941 |
| 2,240,600 | Applegarth | May 6, 1941 |
| 2,240,601 | Applegarth | May 6, 1941 |
| 2,268,811 | Fewings et al. | Jan. 6, 1942 |
| 2,529,428 | Spielman | Nov. 6, 1950 |

UNITED STATES PATENT OFFICE

CERTIFICATE OF CORRECTION

Patent No. 2,819,337 January 7, 1958

Eugene O. Keizer

It is hereby certified that error appears in the printed specification of the above numbered patent requiring correction and that the said Letters Patent should read as corrected below.

Column 2, line 25, for "have at" read -- have a --; column 3, lines 25 and 26, strike out "applying"; line 26, after "means" insert -- applying --.

Signed and sealed this 25th day of February 1958.

(SEAL)
Attest:
KARL H. AXLINE
Attesting Officer

ROBERT C. WATSON
Commissioner of Patents